(12) United States Patent
Dhillon et al.

(10) Patent No.: US 6,843,589 B1
(45) Date of Patent: Jan. 18, 2005

(54) ARMORED AND SIGNATURE MANAGED HEADLIGHTS

(75) Inventors: Jaspal Singh Dhillon, Union City, CA (US); Valent Horvatich, Morgan Hill, CA (US); James Robert Turner, Campbell, CA (US); Marco Albert Middione, Scotts Valley, CA (US)

(73) Assignee: United Defense LP, Arlington, VA (US)

( * ) Notice: Subject to any disclaimer, the term of this patent is extended or adjusted under 35 U.S.C. 154(b) by 77 days.

(21) Appl. No.: 10/356,183

(22) Filed: Jan. 30, 2003

(51) Int. Cl.[7] .............................................. B60Q 1/05
(52) U.S. Cl. ...................... 362/527; 362/287; 362/428; 16/366; 16/370
(58) Field of Search .............................. 362/526, 527, 362/537, 287, 420, 428; 16/366, 370; 296/146.12

(56) References Cited

U.S. PATENT DOCUMENTS

| | | | | |
|---|---|---|---|---|
| 4,796,164 A | * | 1/1989 | Fukura et al. .............. | 362/546 |
| 5,027,301 A | * | 6/1991 | Inoue et al. ................ | 362/527 |
| 5,050,049 A | * | 9/1991 | Shichijoh et al. ........... | 362/527 |
| 5,355,286 A | * | 10/1994 | Flint et al. .................. | 362/527 |
| 6,647,592 B2 | * | 11/2003 | Presley ........................ | 16/366 |

* cited by examiner

Primary Examiner—Y. My Quach-Lee
Assistant Examiner—Peggy A. Neils
(74) Attorney, Agent, or Firm—The Kline Law Firm

(57) ABSTRACT

A low profile lighting system for military or other heavy equipment vehicles that includes a high intensity discharge (HID) headlight, and light emitting diode (LED) turn signals and running light. A microprocessor controller is included to interface to the vehicle lighting control system. An electromechanical actuator lifts and holds the light unit in place. The light unit is mounted on a hidden hinge in an armored and signature managed housing. The unique hinge design allows for electromechanical actuation of the lights from a micro-controller. The special hinge enables the external surfaces of the vehicle to be generally planar, and thereby ready to accept further signature management treatments.

6 Claims, 5 Drawing Sheets

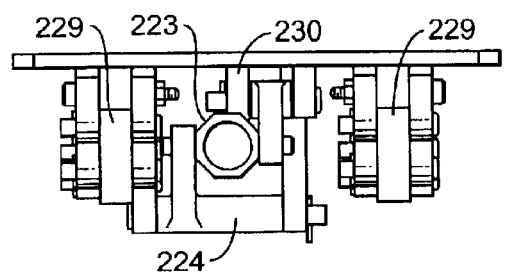
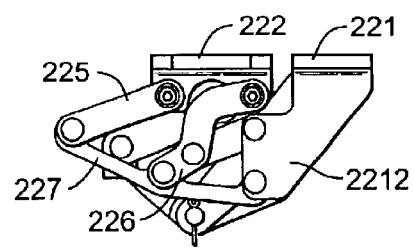
FIG. 7  FIG. 8
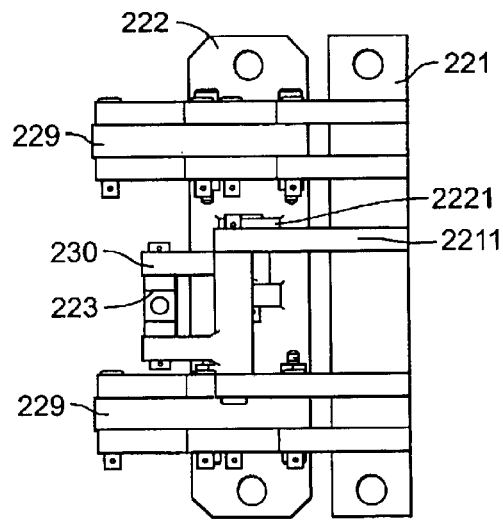
FIG. 9

US 6,843,589 B1

ARMORED AND SIGNATURE MANAGED HEADLIGHTS

BACKGROUND OF THE INVENTION

1. Field of the Invention

The present invention relates generally to lighting for combat vehicles and military equipment, and more particularly is a signature managed headlight that is armored and very durable.

2. Description of the Prior Art

Combat vehicles and other types of military equipment usually have large, bulky lights that, among other drawbacks, can block the drivers' view. The lights are typically incandescent, and were developed in the 1960's. The bulb elements for the lights are large and round and require careful mounting considerations to survive for even a short time on a combat vehicle due to the delicate filament wire that is required for operation of the incandescent bulbs. Because the incandescent filament bulbs are subject to rapid failure, lights with these bulbs require frequent replacement, and are therefore a logistics burden, particularly for a wartime scenario.

In addition, headlight heat from incandescent bulbs creates a thermal signature for the vehicle when the headlights are on. (This often creates a problem when top attack smart munitions are to be employed.) Even when the current art headlights are off, they present multiple visual signature problems. The bulky lights do not permit easy treatments for camouflage or vehicle concealment. Moreover, the current art lights have an internal metalized reflector that can create a visual (sun glint) or radar (reflector) cue even when the lights are off. It is therefore desirable for the lights to be hidden when they are not in use.

A typical method of hiding headlights when they are not in use is to mount the headlights on hinges. Automobile popup headlights are known in the art. However, due to the size and weight requirements for military vehicles, signature managed headlights are typically mounted on external hinges. External hinges themselves pose a radar problem for a signature managed headlight design. Accordingly, it is an object of the present invention to provide a signature managed headlight system that utilizes internal hinges and enables the headlights to be stored within the profile of the vehicle body when the headlights are not in use, thereby allowing the easy application of advanced signature treatments to the external surfaces of the vehicle. The improved design also reduces the radar signature of the vehicle.

It is a further object of the present invention to provide a light system that does not require incandescent filament bulbs, thereby improving durability and reducing the logistics burden.

It is a still further object of the present invention to reduce heat generation and thermal signature.

It is another object of the invention to allow light bulb elements to be concealed under shaped plates to prevent sun glint and radar reflections from the mirrored lens of the lighting element. The shaped plates of the integrated armor protection extend the functional life of the lights, and reduce damage from unintended contact (as in a collision) or intentional contact (as while punching a hole into a building in a breaching operation).

It is still another object of the present invention to reduce power requirements for the lighting system of a vehicle, while providing greater light output for nighttime operations both on-road and off-road, thereby providing an added measure of operational safety.

SUMMARY OF THE INVENTION

The present invention is a low profile lighting system for military or other heavy equipment vehicles that includes a high intensity discharge (HID) headlight, and light emitting diode (LED) turn signals and running light. A microprocessor controller is included to interface to the vehicle lighting control system. An electromechanical actuator lifts and holds the light unit in place. The light unit is mounted on a hidden hinge in an armored and signature managed housing.

Hinges for collapsible headlights are normally external, so the use of an internal hinge in the present invention is a key to the concealing nature of the design. The unique hinge design, with an external virtual axis of rotation, allows for electromechanical actuation of the lights from a microcontroller. The special hinge enables the external surfaces of the vehicle to be smooth, and thereby ready to accept further signature management treatments.

An advantage of the present invention is that the smooth external profile provides a radar signature reduction for the vehicle. Moreover, advanced signature reduction treatments can easily be added over the simple geometry afforded to the exterior profile of the vehicle.

Another advantage of the present invention is that the use of non-filament lights leads to improved durability and reduces the logistics burden of repair and replacement.

A still further advantage of the present invention is that the thermal signature of the light system of the vehicle is reduced by the use of lights that generate less heat than current art lighting systems.

These and other objects and advantages of the present invention will become apparent to those skilled in the art in view of the description of the best presently known mode of carrying out the invention as described herein and as illustrated in the drawings.

BRIEF DESCRIPTION OF THE DRAWINGS

FIG. 7 is a front view of the interior hinge.

FIG. 8 is a side view of the interior hinge.

FIG. 9 is a bottom view of the interior hinge as it would be installed.

DETAILED DESCRIPTION OF THE INVENTION

Figure 1:
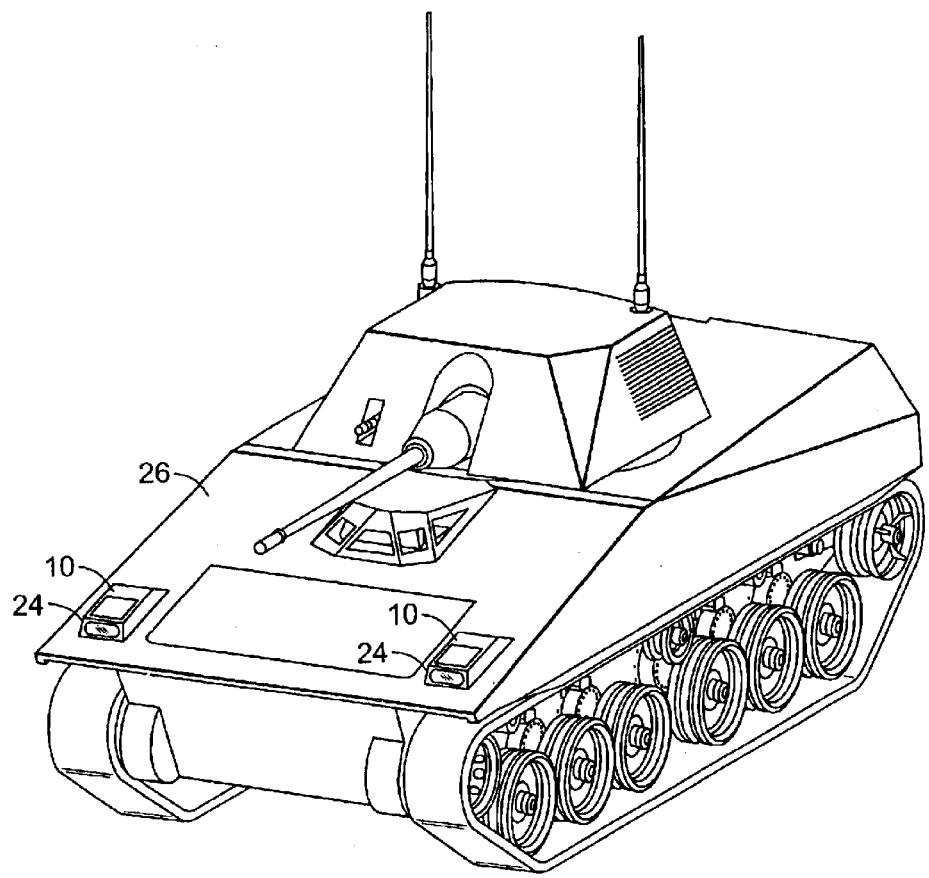
FIG. 1 is a perspective view of a vehicle equipped with the signature managed low profile light system of the present invention.
Figure 2:
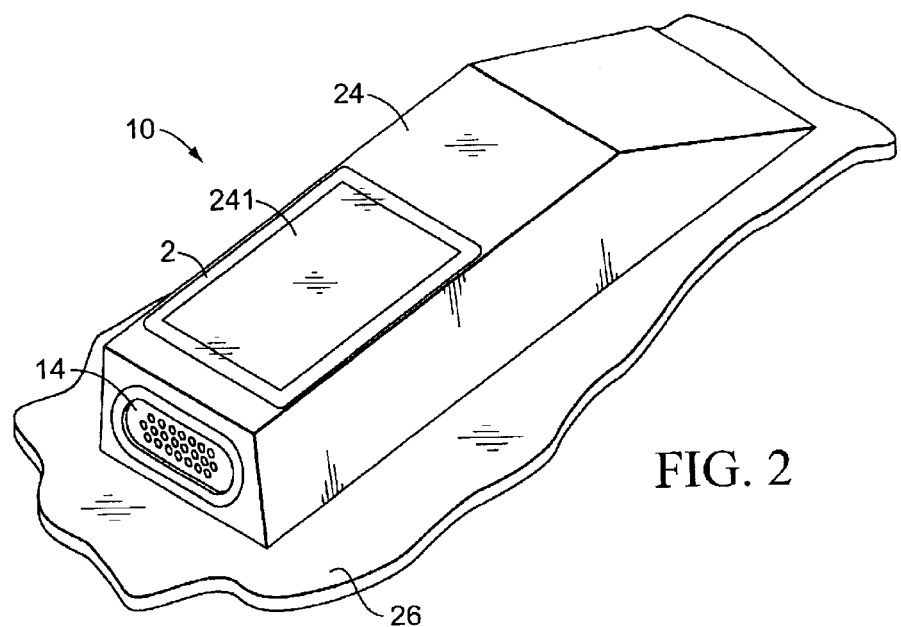
FIG. 2 is a detail view of the light unit mounted on the exterior of the vehicle with the headlight hidden.
Figure 3:
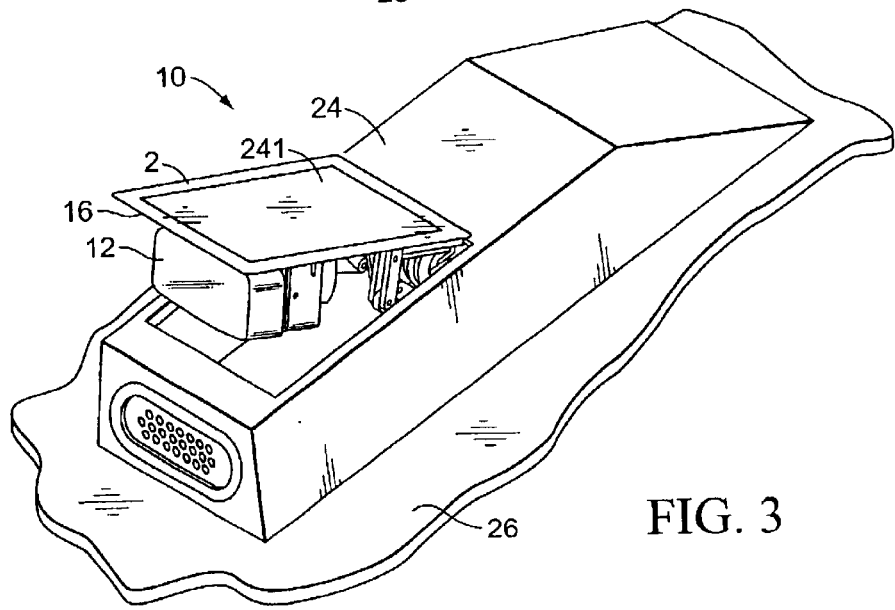
FIG. 3 is a detail view of the light unit mounted on the exterior of the vehicle with the headlight deployed.
Figure 4:
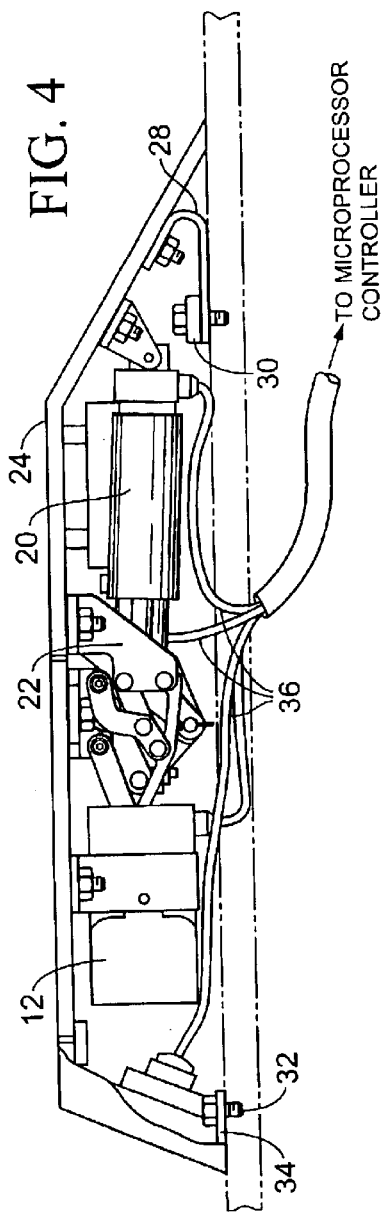
FIG. 4 is a side view of the mounted light unit with the exterior side armor broken for viewing.
Figure 5:
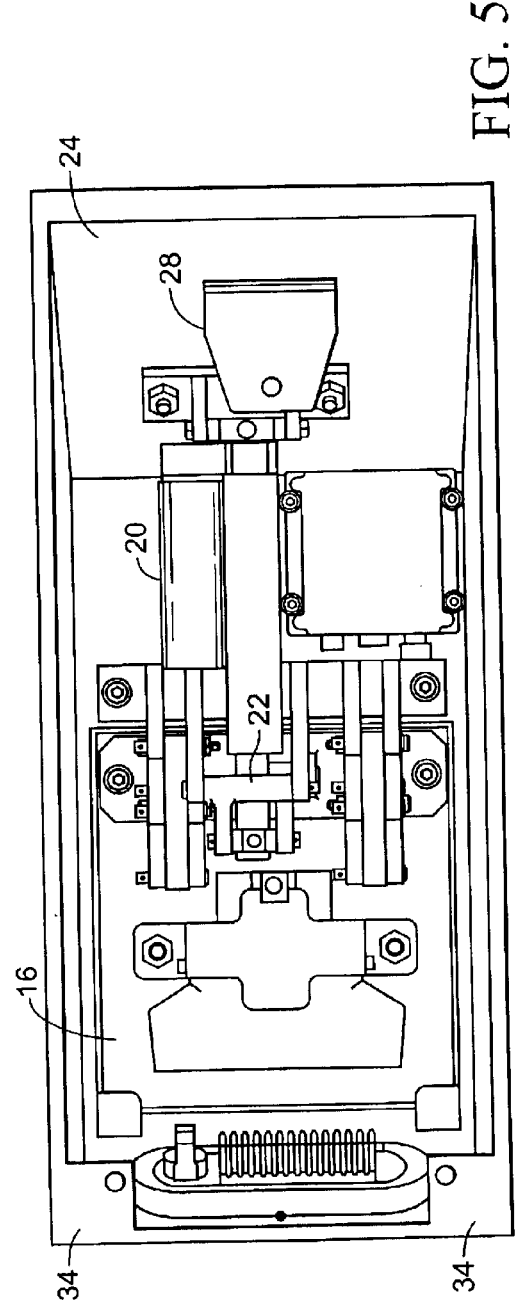
FIG. 5 is a bottom view of the light unit removed from the vehicle.

The present invention is a signature managed, low profile lighting system for a military or other heavy equipment vehicle. The light unit 10 utilized in the lighting system of the present invention comprises a high intensity discharge (HID) headlight 12 and LED turn signals and running (marker) lights 14 mounted on a light fixture 16. The light unit 10 further comprises a microprocessor controller that includes interface to the remainder of the vehicle lighting system control system, an electromechanical actuator 20 that lifts and holds the light fixture 16 in position, a hidden interior hinge 22 that allows the light fixture 16 to be retracted, and an armored and signature managed housing 24.

The headlight 12 comprises a high intensity discharge (HID) lamp and a power control assembly that does not include a lighting filament. This is critical to the increased durability of the headlight 12, as the hot filament in standard headlights is a fragile thing that can and will break under rugged use conditions. The HID headlight 12 is very rugged and can be hard mounted, without causing failure, on trucks, combat vehicles, and other vehicles used in abusive environments. The HID headlight 12 is more efficient and uses 36% less power (35 watts versus 55 watts) than headlights currently used on such vehicle. The reduction in power usage also reduces heat generation, thereby reducing the heat signature of the vehicle.

The HID headlight 12 used in the present invention also generates three times the light output (3200 lumens versus quartz halogen of 1000 lumens) of current art headlights. Moreover, the life of the HID headlight 12 is four to five times longer than a typical automotive bulb. (A standard automotive bulb will last 450 to 600 hours, and the HID headlight 12 will last more than 3300 hours. If the HID headlight 12 is not cycled (on & off), they will last indefinitely.

The turn signals and running (marker) lights 14 utilize LED's for their illumination. The turn signals and running lights 14 using LED's have more than 100,000 hours of life. The LED's of the turn signals and running lights 14 will last the lifetime of the vehicle, and therefore never need replacement. For a combat vehicle, this represents a dramatic improvement in logistics burden. The LED turn signals and running lights 14 also consume 75 percent less power and generate less heat than standard turn signals and marker lights, while providing an equivalent amount of light output.

The microprocessor controller provides precise control of the elevation position of the headlight 12. The headlight 12 has at least three defined positions—a closed position, a low beam position, and a high beam position—and is adjustable to any emitting angle within its range of motion desired by the user. The controller uses onboard vehicle attitude information to provide automatic directional adjustment for the headlight 12. The headlight 12 can also be manually controlled with a control device that feeds through the controller. The controller interfaces with the existing vehicle lighting wiring system and does not require any electrical modifications of the basic vehicle. The microprocessor controller is protected with transient voltage suppressors and voltage regulators to withstand harsh electrical noise, which is not uncommon in a combat vehicle application.

An electromechanical actuator 20 is used in conjunction with, and controlled by, the microprocessor controller to adjust the light emitting angle of the headlight 12 via the hidden interior hinge 22. When the headlight 12 is at a desired position, the actuator 20 receives a brake command so that the actuator 20 is held in position, thereby eliminating movement of the headlight 12.

The hidden interior hinge 22 is a key element of the light unit 10 of the lighting system of the present invention. The hidden hinge 22 interfaces between the electromechanical actuator 20 and the headlight 12 that is affixed to an armored door panel 241 that is part of the light unit housing 24. The hidden interior hinge 22 is unique in that the center of rotation of the armored door panel 241 is outside of the housing 24 enclosure, while the hinge 22 itself is physically located inside the light unit housing 24. This characteristic of the hinge 22 allows the door panel 241 to be opened without binding, even when thick armor and signature treatment materials are used for the door panel 241 and the light unit housing 24. Further, the interior location of the hinge 22 provides a signature management factor as the hinge does not need to be mounted outside of the housing 24. Ordinary externally mounted hinges extend beyond the profile of the vehicle hull, and therefore add to the signatures of the vehicle. The hinge 22 is made of rugged, heat-treated steel and is thus able to endure a combat vehicle environment of shock, vibration, and hard use.

Figure 6:
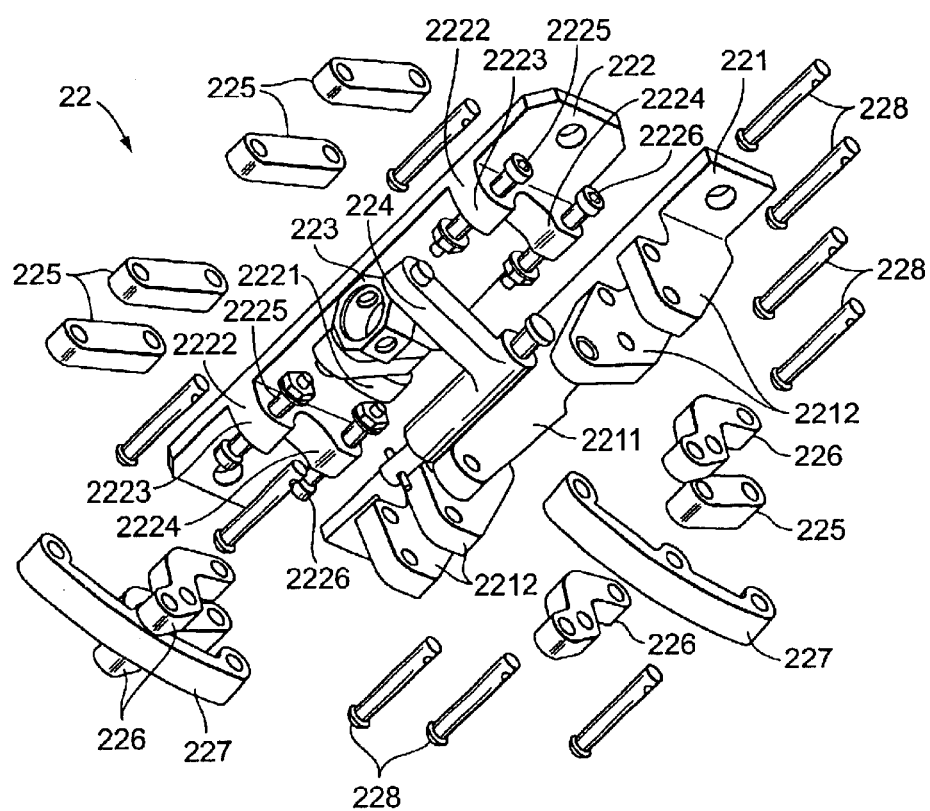
FIG. 6 is an exploded view of the interior hinge of the present invention.

The hinge 22 structure is shown in detail in FIGS. 6–9. The structure comprises a housing attachment plate 221 that is secured to the fixed portion of the light unit housing 24, and a light fixture attachment plate 222 that is secured to the movable light fixture 16 of the unit 10. An actuator arm socket 223 is pivotally attached to both the light fixture attachment plate 222 and the housing attachment plate 221. The actuator arm socket 223 receives an arm from the electromechanical actuator 20 to drive the movement of the light fixture 16.

The connection of the socket 223 to the housing attachment plate 221 and to the light fixture attachment plate 222 is accomplished by a "double jointed" mechanism that allows the hinge 22 to expand when driven by the actuator 20. A first side of the arm socket 223 is pivotally attached to connecting lever 224, which is in turn pivotally attached to the housing attachment plate 221 by means of connecting struts 2211 that are integral to the housing attachment plate 221. A second side of the arm socket 223 is pivotally attached to a straight linkage bar 225, which is in turn pivotally attached to the light fixture attachment plate 222 by means of integral connecting struts 2221 to form the second half of the double joint.

A pair of stabilizing hinge elements 229, which are also "double jointed", are situated on ether side of the actuator arm socket connection hinge element 230. The stabilizing hinge elements comprise integral connecting struts 2212 on the housing attachment plate 221, and similar connecting struts 2222 on the light fixture attachment plate 222. The light fixture connecting struts 2222 each comprise a front connection boss 2223 and a rear connection boss 2224. The front connection boss 2223 receives a rotating front connection axle 2225, and the rear connection boss 2224 receives a rotating rear connection axle 2226. Each front connection axle 2225 pivotally receives a first end of a pair of the straight linkage bars 225. Each rear connection axle 2226 pivotally receives a first end of a pair of eccentric linkage bars 226.

The second ends of the straight linkage bars 225 and the second ends of the eccentric linkage bars 226 are rotatably connected respectively with a first end of a three point hinge bar 227 and a midpoint of the hinge bar 227. The second ends of both the straight linkage bars 225 and the eccentric linkage bars 226 are secured by connecting pins 228 that pass through receiving holes in the hinge bar 227. The second ends of the three point hinge bars 227 are rotatably secured by connecting pins 228 that are secured in aligned holes in a lower side of the housing connecting struts 2211.

The final pivot point of the interior hinge 22 is made by connecting another straight linkage bar 225 at a first end to a point between the two ends of the two sets of eccentric linkage bars 226. The second ends of the straight linkage bars 225 that are connected to the bodies of the eccentric linkage bars 226 are rotatably secured by connecting pins 228 that are received in aligned holes in an upper side of the housing connecting struts 2211.

The double jointed structure of the hinge 22 of the present invention gives the light unit 10 the unique capability of having the entire hinge 22 mechanism physically located below the upper surface of the housing 24. However, when the actuator 20 drives the hinge 22, the nominal axis of rotation of the hinge lies above the upper surface of the housing 24. When the arm of the actuator 20 drives the actuator arm socket 223 forward, the hinge 22 expands and rotates the light fixture 16 outward.

The light unit housing 24 is constructed of armor materials and shaped as a trapezoid for signature management purposes. The trapezoid shape eliminates any right angle (90 degree) facets, which is beneficial in that right angle facets contribute to poor radar performance (high radar reflectance). The clean lines and smooth shape of the housing 24 also allows signature management coatings and materials to be readily bonded, applied, or attached to the outer surfaces of the housing 24 without any required redesign of the hinge 22 or of the mounting system for the light unit 10.

While there are many satisfactory ways in which the light unit 10 can be mounted on the vehicle, in the preferred embodiment, the light unit housing 24 is secured to the vehicle hull 26 with an internal tab 28 that is mounted at the rear of the housing 24. The tab 28 is received in a socket 30 affixed to the vehicle hull 26. The front end of the housing 24 is secured by two hex bolt fasteners 32 received in mounting ears 34 at a front inside edge of the housing 24. The light unit 10 is installed by first connecting the electrical feeds 36, then placing the light unit 10 assembly over the socket 30 mounted on the vehicle hull 26 and sliding the light unit 10 toward the front of the vehicle so that the tab 28 engages the socket 30. Then, with the LED for the turn signals and running lights 14 removed, the two front hex bolts 32 are inserted. The LED is then re-installed with multiple screws located around the bezel, and the system is ready for use.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

What is claimed is:

1. A low profile lighting system comprising:
   at least one headlight,
   at least one light fixture,
   an actuator, and
   a light unit housing; wherein
   said headlight is mounted on said light fixture, said light fixture being contained within a profile of said light unit housing when said headlight is not in use, and
   said actuator moves said light fixture to a position in which said headlight projects above a top surface of said light unit housing when said headlight is to be deployed
   said light fixture is pivotally mounted on a hinge, said hinge lying within an interior of said light unit housing, and an axis of rotation of said light fixture being outside said interior of said housing,
   said hinge comprises an actuator arm hinge mechanism and at least one stabilizing hinge mechanism, each said stabilizing hinge mechanism comprising at least one straight linkage bar, at least one eccentric linkage bar, and a three point hinge bar, and each said stabilizing hinge mechanism is pivotally connected to both said light fixture and a fixed portion of said light unit housing; and wherein
   said actuator arm hinge mechanism comprises
   an actuator arm socket and at least one straight linkage bar pivotally connecting said actuator arm socket to said light fixture, there being a first pivot point at a connection point of said straight linkage bar and said actuator arm socket, and a second pivot point at a connection point of said straight linkage bar and said light fixture, and
   a connecting lever pivotally connecting said actuator arm socket to a fixed portion of said light unit housing, there being a first pivot point at a connection point of said connecting lever and said actuator arm socket, and a second pivot point at a connection point of said connecting lever and said fixed portion of said light unit housing.

2. The lighting system of claim 1 wherein:
   a first end of a first one of said straight linkage elements is pivotally attached to said light fixture, and a second end of said first one of said straight linkage elements is pivotally attached to a first end of said three point hinge bar,
   a first end of said eccentric linkage bar is pivotally attached to said light fixture, and a second end of said eccentric linkage bar is pivotally attached to a body of said three point hinge bar,
   a first end of a second one of said straight linkage elements is pivotally attached to said fixed portion of said light unit housing, and a second end of said second one of said straight linkage elements is pivotally attached to a body of said eccentric linkage bar, and
   a second end of said three point hinge bar is pivotally attached to said fixed portion of said light unit housing.

3. A low profile lighting system comprising:
   a light fixture mounted on a light unit housing by a hinge, said hinge lying within an interior of said light unit housing, and an axis of rotation of said light fixture being outside said interior of said housing,
   said hinge comprises an actuator arm hinge mechanism and at least one stabilizing hinge mechanism, each said stabilizing hinge mechanism comprising at least one straight linkage bar, at least one eccentric linkage bar, and a three point hinge bar, and each said stabilizing hinge mechanism being connected to both said light fixture and a fixed portion of said light unit housing; wherein
   said actuator arm hinge mechanism comprises
   an actuator arm socket and at least one straight linkage bar pivotally connecting said actuator arm socket to said light fixture, there being a first pivot point at a connection point of said straight linkage bar and said actuator arm socket, and a second pivot point at a connection point of said straight linkage bar and said light fixture, and
   a connecting lever pivotally connecting said actuator arm socket to a fixed portion of said light unit housing, there being a first pivot point at a connection point of said connecting lever and said actuator arm socket, and a second pivot point at a connection point of said connecting lever and said fixed portion of said light unit housing.

4. The light system of claim 3 wherein:

a first end of a first one of said straight linkage elements is pivotally attached to said light fixture, and a second end of said first one of said straight linkage elements is pivotally attached to a first end of said three point hinge bar, a first end of said eccentric linkage bar is pivotally attached to said light fixture, and a second end of said eccentric linkage bar is pivotally attached to a body of said three point hinge bar, a first end of a second one of said straight linkage elements is pivotally attached to said fixed portion of said light unit housing, and a second end of said second one of said straight linkage elements is pivotally attached to a body of said eccentric linkage bar, and a second end of said three point hinge bar is pivotally attached to said fixed portion of said light unit housing.

5. A hinge mechanism comprising:

an actuator arm hinge mechanism and at least one stabilizing hinge mechanism affixed to an underside of a fixed base, each said stabilizing hinge mechanism comprising at least one straight linkage bar, at least one eccentric linkage bar, and a three point hinge bar, and each said stabilizing hinge mechanism being connected to both a load being supported by said hinge and said fixed base; such that said hinge lies beneath a plane of said load, and an axis of rotation of said load lies above a plane of said fixed base; and wherein said actuator arm hinge mechanism comprises an actuator arm socket and at least one straight linkage bar pivotally connecting said actuator arm socket to said load, there being a first pivot point at a connection point of said straight linkage bar and said actuator arm socket, and a second pivot point at a connection point of said straight linkage bar and said load, and a connecting lever pivotally connecting said actuator arm socket to a fixed portion of said light unit housing, there being a first pivot point at a connection point of said connecting lever and said actuator arm socket, and a second pivot point at a connection point of said connecting lever and said fixed portion of said fixed base.

6. The hinge mechanism of claim 5 wherein:

a first end of a first one of said straight linkage elements is pivotally attached to said load, and a second end of said first one of said straight linkage elements is pivotally attached to a first end of said three point hinge bar, a first end of said eccentric linkage bar is pivotally attached to said load, and a second end of said eccentric linkage bar is pivotally attached to a body of said three point hinge bar, a first end of a second one of said straight linkage elements is pivotally attached to said fixed base, and a second end of said second one of said straight linkage elements is pivotally attached to a body of said eccentric linkage bar, and a second end of said three point hinge bar is pivotally attached to said fixed base.

* * * * *